United States Patent
Talukdar et al.

(10) Patent No.: US 12,039,091 B2
(45) Date of Patent: Jul. 16, 2024

(54) INTEGRATED CIRCUIT PROTECTIONS AGAINST REMOVAL AND ORACLE-GUIDED ATTACKS

(71) Applicant: Duke University, Durham, NC (US)

(72) Inventors: Jonti Talukdar, Durham, NC (US); Krishnendu Chakrabarty, Durham, NC (US)

(73) Assignee: DUKE UNIVERSITY, Durham, NC (US)

( * ) Notice: Subject to any disclaimer, the term of this patent is extended or adjusted under 35 U.S.C. 154(b) by 468 days.

(21) Appl. No.: 17/496,055

(22) Filed: Oct. 7, 2021

(65) Prior Publication Data

US 2023/0116607 A1  Apr. 13, 2023

(51) Int. Cl.
*G06F 21/75* (2013.01)
*G11C 29/36* (2006.01)
*H03K 19/21* (2006.01)

(52) U.S. Cl.
CPC .............. *G06F 21/75* (2013.01); *G11C 29/36* (2013.01); *G11C 2029/3602* (2013.01); *H03K 19/21* (2013.01)

(58) Field of Classification Search
None
See application file for complete search history.

(56) References Cited

U.S. PATENT DOCUMENTS

| | | | | |
|---|---|---|---|---|
| 7,346,823 B1* | 3/2008 | Maheshwari | .. | G01R 31/318547 714/733 |
| 7,895,327 B2* | 2/2011 | Klimov | .... | G06F 21/75 709/200 |
| 2011/0148457 A1* | 6/2011 | Abramovici | ........... | G06F 21/14 326/8 |
| 2011/0255689 A1* | 10/2011 | Bolotov | ............... | H04L 9/0631 380/42 |
| 2014/0340112 A1* | 11/2014 | Tehranipoor | ......... | H04L 9/0869 326/8 |
| 2017/0083459 A1* | 3/2017 | Riou | ................... | G06F 12/1466 |

(Continued)

OTHER PUBLICATIONS

Benjamin Tan et al. "Benchmarking at the Frontier of Hardware Security: Lessons from Logic Locking", arXiv, Jun. 11, 2020, 16 pages.

(Continued)

*Primary Examiner* — Christopher C Harris
(74) *Attorney, Agent, or Firm* — Talem IP Law, LLP

(57) ABSTRACT

An integrated circuit (IC) protection circuit for an IC includes a controller with a barrier finite state machine (FSM) having a key sequence input that unlocks the controller; and a signal scrambler coupled to receive at least two initialization inputs and a primary input path and output a signal to the IC, wherein at least one initialization input of the at least two initialization inputs is based on an output of the barrier FSM. The IC protection circuit can further include a dynamic authentication circuit coupled to receive the output of the barrier finite state machine and output a signal to the signal scrambler for one of the at least two initialization inputs. The dynamic authentication circuit can be formed of a dynamic sequence generator and a dynamic sequence authenticator, each formed of one or more reconfigurable linear feedback shift registers, and a comparator.

18 Claims, 9 Drawing Sheets

(56) References Cited

U.S. PATENT DOCUMENTS

| | | | | |
|---|---|---|---|---|
| 2017/0131355 | A1* | 5/2017 | Johnson | G01R 31/31719 |
| 2019/0129892 | A1* | 5/2019 | Sinanoglu | G06F 16/252 |
| 2019/0340394 | A1* | 11/2019 | Sinanoglu | G01R 31/31719 |
| 2020/0065456 | A1* | 2/2020 | Tehranipoor | G06F 21/14 |
| 2021/0083868 | A1* | 3/2021 | Lee | G01R 31/318588 |
| 2022/0374553 | A1* | 11/2022 | Bhunia | G06F 21/74 |
| 2023/0177245 | A1* | 6/2023 | Sinanoglu | G09C 1/00 716/100 |

OTHER PUBLICATIONS

Abhishek Chakraborty et al. "Keynote: A Disquisition on Logic Locking," IEEE Transactions on Computer-Aided Design of Integrated Circuits and Systems, Oct. 2020, 21 pages, vol. 39, No. 10.

Siyuan Chen et al. "BISTLock: Efficient IP Piracy Protection using BIST," IEEE International Test Conference, 2020, 5 pages.

Mohamed El Massad et al. "Reverse Engineering Camouflaged Sequential Circuits Without Scan Access," IEEE/ACM (ICCAD), Nov. 2017, 9 pages.

Kaveh Shamsi et al. "KC2: Key-Condition Crunching for Fast Sequential Circuit Deobfuscation," Design, Automation and Test in Europe, 2019, 6 pages.

Jeyavijayan Rajendran et al. "Fault Analysis-Based Logic Encryption," IEEE Transactions on Computers, Feb. 2015, 15 pages, vol. 64, No. 2.

Pramod Subramanyan et al. "Evaluating the Security of Logic Encryption Algorithms," IEEE International Symposium on Hardware Oriented Security and Trust, 2015, 7 pages.

Yang Xie et al. "Anti-SAT: Mitigating SAT Attack on Logic Locking," IEEE Transactions on Computer-Aided Design of Integrated Circuits and Systems, Feb. 2019, 9 pages, vol. 38, No. 2.

Muhammad Yasin et al. "Removal Attacks on Logic Locking and Camouflaging Techniques," Journal of Latex Class Files, Aug. 2015, 14 pages, vol. 14. Issue 8.

Kaveh Shamsi et al. "AppSAT: Approximately Deobfuscating Integrated Circuits," IEEE International Symposium on Hardware Oriented Security and Trust, 2017, 6 pages.

Rajat Subhra Chakraborty et al. "HARPOON: An Obfuscation-Based SoC Design Methodology for Hardware Protection," IEEE Transactions on Computer-Aided Design of Integrated Circuits and Systems, Oct. 2009, 10 pages, vol. 28, No. 10.

Hadi Mardani Kamali et al. "SCRAMBLE: The State, Connectivity and Routing Augmentation Model for Building Logic Encryption," IEEE Computer Society Annual Symposium on VLSI, 2020, 7 pages.

Marc Fyrbiak et al. "On the Difficulty of FSM-based Hardware Obfuscation," IACR TCHES, 2018, 38 pages, vol. 2018, No. 3.

Ehsan Aerabi et al. "Mystic: Mystifying IP Cores Using an Always-ON FSM Obfuscation Method," IEEE Computer Society Annual Symposium on VLSI, 2018, 6 pages.

Rajit Karmakar et al. "On Securing Scan Obfuscation Strategies Against ScanSAT Attack," 21st Int'l Symposium on Quality Electronic Design, 2020, 6 pages.

Nimisha Limaye et al. "Thwarting All Logic Locking Attacks: Dishonest Oracle With Truly Random Logic Locking," IEEE Transactions on Computer-Aided Design of Integrated Circuits and Systems, Sep. 2021, 14 pages, vol. 40, No. 9.

Nimisha Limaye et al. "DynUnlock: Unlocking Scan Chains Obfuscated using Dynamic Keys," Design, Automation and Test in Europe, 2020, 4 pages.

M. Doulcier et al. "AES-based BIST: self-test, test pattern generation and signature analysis," 4th IEEE International Symposium on Electronic Design, Test and Applications, Jan. 2008, 8 pages.

Randy Torrance et al. "The State-of-the-Art in Semiconductor Reverse Engineering," DAC, 2011, 6 pages.

M. Tanjidur Rahman et al. "The Key is Left under the Mat: On the Inappropriate Security Assumption of Logic Locking Schemes," IEEE International Symposium on Hardware Oriented Security and Trust, 2020, 11 pages.

Alan Mishchenko et al. "Improvements to Combinational Equivalence Checking," IEEE ICCAD, 2006, 8 pages.

Jonti Talukdar et al. "Supplementary Material for: A BIST-based Dynamic Obfuscation Scheme for Resilience against Removal and Oracle-guided Attacks," IEEE (ITC), Apr. 23, 2021, 5 pages.

Rajat Subhra Chakraborty et al. "MERO: A Statistical Approach for Hardware Trojan Detection," CHES, 2009, 15 pages.

Travis Meade et al. "Revisit Sequential Logic Obfuscation: Attacks and Defenses," IEEE ISCAS, 2017, 4 pages.

Prabuddha Chakraborty et al. "SAIL: Machine Learning Guided Structural Analysis Attack on Hardware Obfuscation," IEEE AsiaHOST, 2018, 6 pages.

Prabuddha Chakraborty et al. "SURF: Joint Structural Functional Attack on Logic Locking," IEEE International Symposium on Hardware Oriented Security and Trust, 2019, 10 pages.

Danielle Duvalsaint et al. "Characterization of Locked Combinational Circuits via ATPG," IEEE International Test Conference, 2019, 10 pages.

* cited by examiner

INTEGRATED CIRCUIT PROTECTIONS AGAINST REMOVAL AND ORACLE-GUIDED ATTACKS

GOVERNMENT SUPPORT

This invention was made with government support under Federal Grant No. CNS-2011561 awarded by the National Science Foundation. The government has certain rights in the invention.

BACKGROUND

The rapid globalization of the integrated circuit (IC) supply chain has resulted in the outsourcing of fabrication and testing operations to third parties. These third parties are considered untrusted parties or entities because they have access to the intellectual property relevant to an IC design but are not the originating entity of that intellectual property and therefore are a potential risk for malevolent actions. Indeed, this outsourced manufacturing flow poses significant risk to the security of intellectual property as it becomes exposed to malevolent untrusted third parties who may change the design, try to steal the information, counterfeit or overbuild the IC, or insert hardware Trojans in the design.

Logic locking is an approach to protect the integrity of a design through the fabrication and testing process. In general, logic locking works by using "locking logic" that is inserted into a design that allows for unlocking of functionality upon the application of the correct key. Combinational locking techniques insert key gates into the design, while sequential locking techniques insert obfuscation states and state transitions to prevent an adversary from accessing the correct order of functional states.

BRIEF SUMMARY

Integrated circuit (IC) protections against removal and oracle-guided attacks are described. A built-in-self-testing (BIST) framework is leveraged as part of a logic locking approach to protect against design theft.

An IC with logic locking protections can include a controller with a barrier finite state machine (FSM) having a key sequence input that unlocks the controller; and a signal scrambler coupled to receive at least two initialization inputs and a primary input path and output a signal to the IC, wherein at least one initialization input of the at least two initialization inputs is based on an output of the barrier FSM.

The IC protection circuit providing the logic locking protections can further include a dynamic authentication circuit coupled to receive the output of the barrier finite state machine and output a signal to the signal scrambler for one of the at least two initialization inputs. The dynamic authentication circuit can be formed of a dynamic sequence generator and a dynamic sequence authenticator, each formed of one or more reconfigurable linear feedback shift registers (in which the feedback is reconfigurable), and a comparator.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Integrated circuit (IC) protections against removal and oracle-guided attacks are described. A built-in-self-testing (BIST) framework is leveraged as part of a logic locking approach to protect against design theft.

Figure 1:
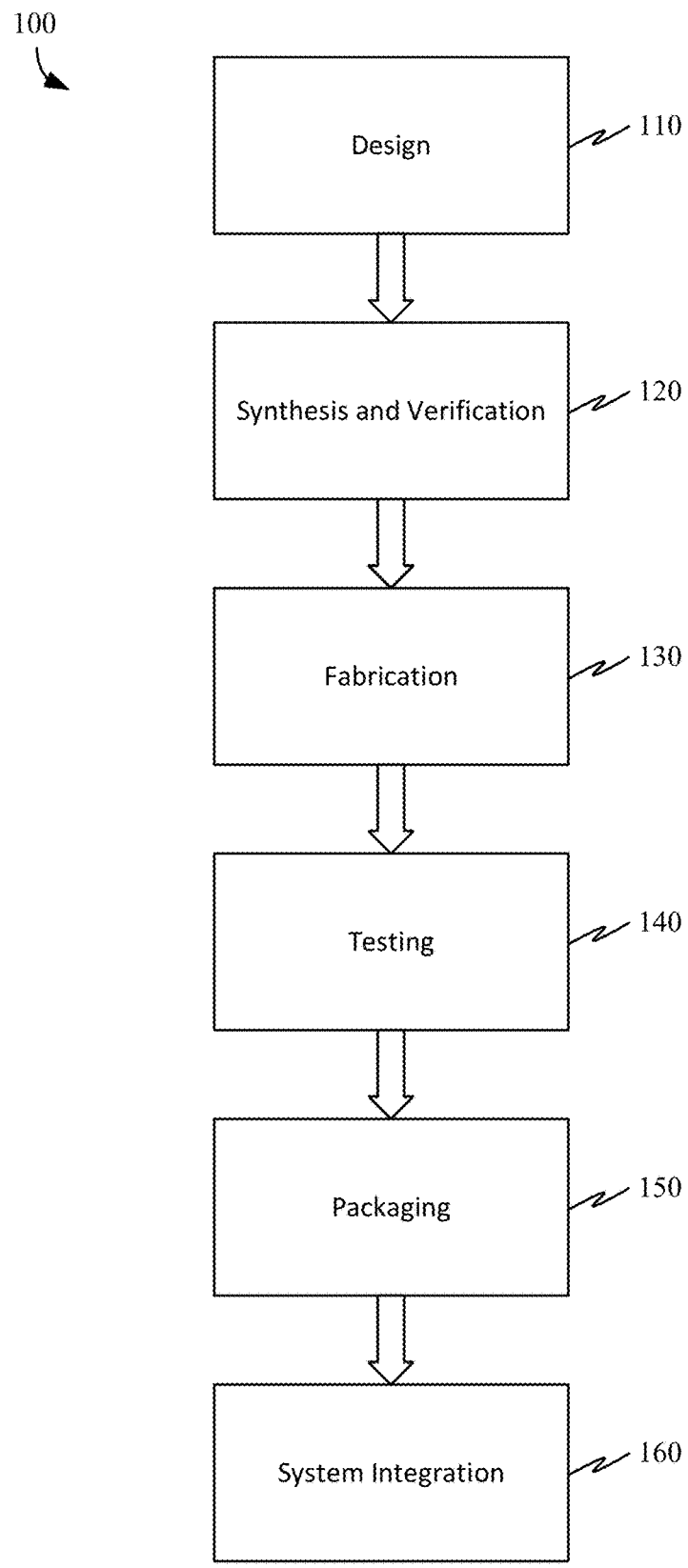
FIG. 1 illustrates areas for hardware security and hardware trust of a design and manufacturing flow.

FIG. 1 illustrates areas for hardware security and hardware trust of a design and manufacturing flow. With the semiconductor supply chain distributed across the globe, there are multiple untrusted entities working and contributing towards the different steps of a design and manufacturing flow. These entities include, but are not limited to, tool vendors, foundry, test and distribution facilities, and computer assisted design tools (such as for netlist extraction). Hardware security issues arise from a hardware's own vulnerability to different types of attacks at different levels (e.g., design stage, chip fabrication stage, and system integrated such as when integrated on a printed circuit board (PCB)). Hardware Trust arises from the involvement of untrusted entities in the hardware lifecycle itself.

There are a number of levels of threats to the IC design, including oracle-based attacks and oracle-free attacks. A threat model for an oracle-based attack includes having access to the reverse-engineered netlist (obtained from layout) and access to functionally operational oracle (e.g., procured from the market). Oracle-based attacks generally refer to attacks where inputs are applied to a system in order to result in outputs (direct or indirect) from which the underlying algorithm or secret information can be obtained. Access to the reverse-engineered netlist allows an attacker to analyze and bypass built-in defenses to unlock the circuit design. Access to the functionally operational oracle allows an attacker to obtain correct input/output response pairs for the design under attack. Popular oracle-based attacks include SAT-attack (and its enhancements) and sequential SAT. SAT refers to a Boolean Satisfiability based attack or "satisfiability". Popular oracle-free attacks include removal attacks, bypass attacks based on netlist-analysis, signal skew, etc., and redundancy-based attacks.

The logic locking of the IC protections described herein provide various levels of security against multiple untrusted environments, including at an integrator, foundry, test facility, and at the end user. Referring to FIG. 1, a design flow and lifecycle 100 can involve design 110, synthesis and verification 120, fabrication 130, testing 140, packaging 150, and system integration 160 (and reuse).

Design 110 can involve in-house design teams and integration teams that integrate designs from the in-house design teams and designs that may be provided by different vendors. Here, the untrusted party may be the integrator. Certain IC protections against removal and oracle-guided attacks can be applied at the design 110 stage (prior to integration) and incorporated into the register-transfer level (RTL) netlist to assist with vulnerabilities at later stages of the design flow and lifecycle 100.

Synthesis and verification 120 can begin upon receipt of the RTL netlist from the design integration of the design 110 stage; and includes RTL verification, logic synthesis, gate-level netlist generation, physical synthesis, layout generation, and layout verification, among other processes. Certain IC protections against removal and oracle-guided attacks can be applied at the synthesis and verification 120 stage. For example, automated place and route processes can be used to integrate/distribute the hardware circuitry/logic of the IC protection architecture described herein with the circuit design of the circuit to be protected. Indeed, features of the IC protection architecture described herein can be synthesized together with the circuit design, making it harder for an entity to identify the IC protection architecture for a removal type of attack.

The layout/tapeout files are then sent to a foundry for fabrication 130 of wafers. The foundry may be an untrusted party. The wafers are tested as part of the testing 140 stage; and a third untrusted party (e.g., test facility) may be responsible for testing, packaging, and assembly carried out as part of the packaging 150 stage. System integration 160 may be carried out by yet another untrusted party (who could be considered the end-user) and involve incorporating the packaged IC chip (from the packaging 150 stage) into a PCB assembly, which may include outdated systems, be part of recycling/repackaging, or include "out-of-spec" ICs. The IC protection architecture described herein can be used to protect against certain risks at these post-tapeout stages such that even if a bad actor at or associated with one of the untrusted entities have access to the actual chip, the chip cannot be used—even with reverse engineering—because the design is locked. That is, a goal of various implementations of the described IC protection architecture is to lock the design in such a way that only an authorized user who has the correct key will be able to functionally unlock the design.

As mentioned above, the described IC protection architecture leverages the BIST framework as part of a logic locking approach.

Figures 2A, 2B:
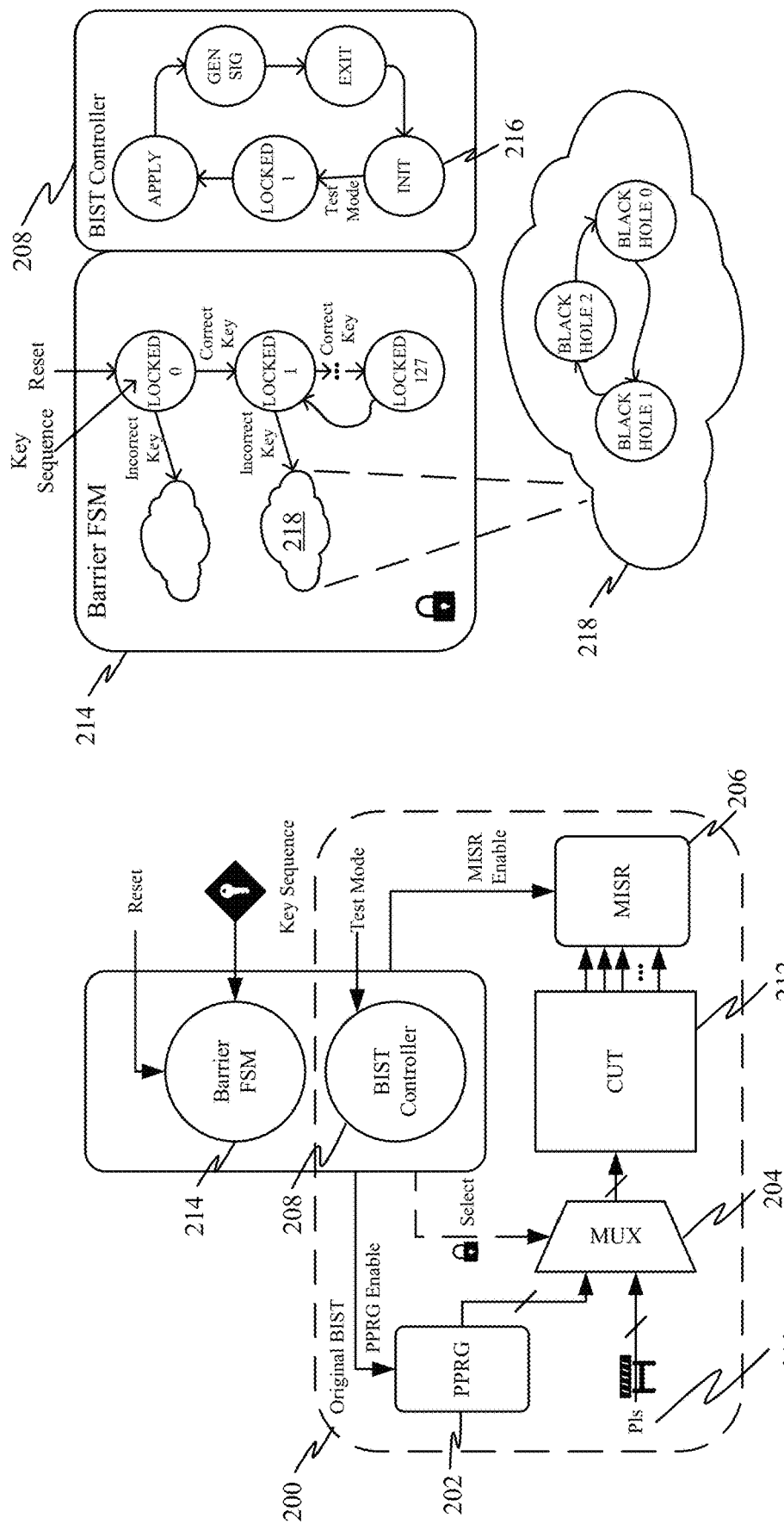
FIGS. 2A and 2B illustrate a simple logic locking approach within the BIST framework.

FIGS. 2A and 2B illustrate a simple logic locking approach within the BIST framework. Referring to FIG. 2A, a basic BIST architecture 200 can include a pseudorandom pattern generator (PRPG) 202, multiplexer (MUX) 204 and multiple input signature register (MISR) 206 all of which are controlled by the enable signals output by a BIST Controller 208.

The PRPG 202 can be used to generate test patterns. In some cases, other components may be used to generate a test pattern, including a memory with stored patterns, a counter, and a linear feedback shift register (LFSR).

The MUX 204 is used to select between the test patterns from the PRPG 202 (e.g., test mode) and primary inputs (PIs) 210 (e.g., functional mode). During test mode (enabled by the BIST Controller 208), the test patterns are applied to the circuit under test (CUT) 212. During functional mode the CUT receives the primary inputs (e.g., from other modules as designed) and performs functional operations. Although not shown, scan chains are generally disposed at boundaries of the CUT 212 through which the test patterns can be directed (by MUX 204 and other MUXs of the BIST design) to appropriate logic and observation points. In some cases, scan chains can be locked to prevent unauthorized access to the design (also referred to as "scan locking").

The MISR 206 is used to compact and analyze the test responses output by the CUT 212 during test mode, which are compared to 'golden' signatures generated or stored on-chip to determine whether the CUT 212 includes faults or is fault free (based on the tests).

An example logical operation of the BIST controller 208 is shown in FIG. 2B, where test mode can be selected to direct pattern generation (e.g., provide PRPG Enable signal), apply the test patterns to the CUT 212 (e.g., provide the select signal to the MUX 204), direct signature generation (e.g., provide the MISR Enable signal) and exit test mode.

For a simple logic locking approach, the BIST controller 208 can include a barrier finite state machine (FSM) 214. The barrier FSM 214 is used to only allow the switch from test mode to functional mode when an appropriate key is applied.

FIG. 2B shows the operation of the barrier FSM 214 to lock the functional operation of the circuit. Referring to FIG. 2B, the barrier FSM 214 is a state transition finite state machine that reaches the initial state 216 of the BIST controller 208 when the appropriate key is applied. If even a single key bit is changed, the barrier FSM 214 locks the design by transitioning into a set of self-looping black hole states 218 such that irrespective of any other key bit that is entered, the design will remain locked (until reset and a correct key is applied). In addition, the FSM 214 can be designed to wrap around itself after the last locked state, making it difficult for an attacker to determine the length of the key sequence. Only when the correct set of key bits are applied, the design will go through the lock states (e.g., 0 to 127 for the illustrated example) to finally reach the unlocked state, where the test mode can change from self-test to functional mode. In some cases, access to test mode may also be blocked unless the correct key is applied.

Because the barrier FSM 214 can be integrated with the BIST controller 208, it is more difficult to separate the different states of the barrier FSM 214 to remove them. However, it is possible for an attacker to identify a MUX gate and hardwire to remove the MUX/bypass the select lines for the MUX so that primary inputs can be applied to the circuit. Accordingly, the described IC protection architecture utilizes a scrambler design to provide the MUX selection functionality.

Figure 3B:
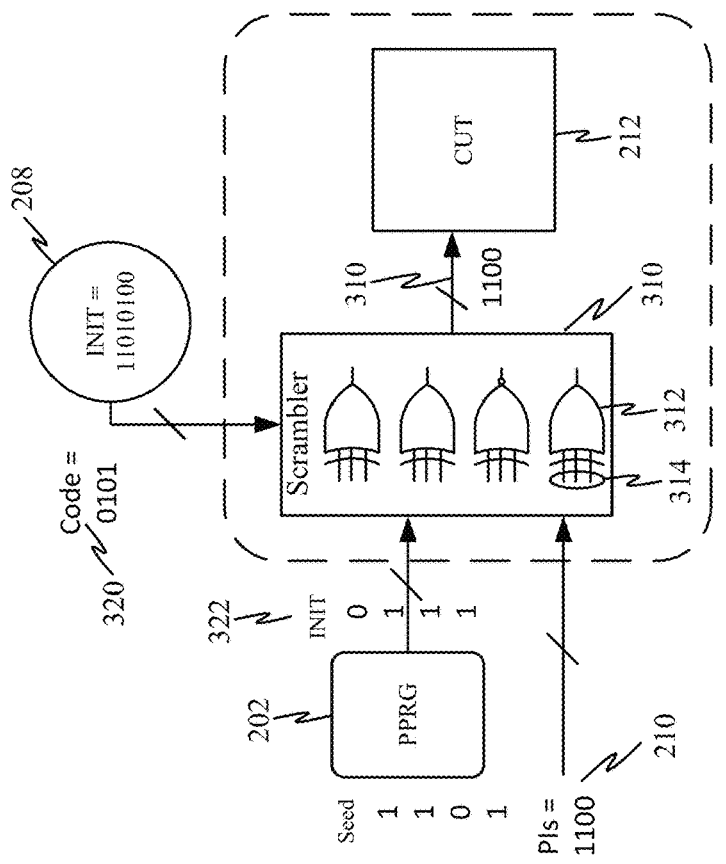
FIG. 3B illustrates an example signal scrambler design and corresponding operation.
Figure 3A:
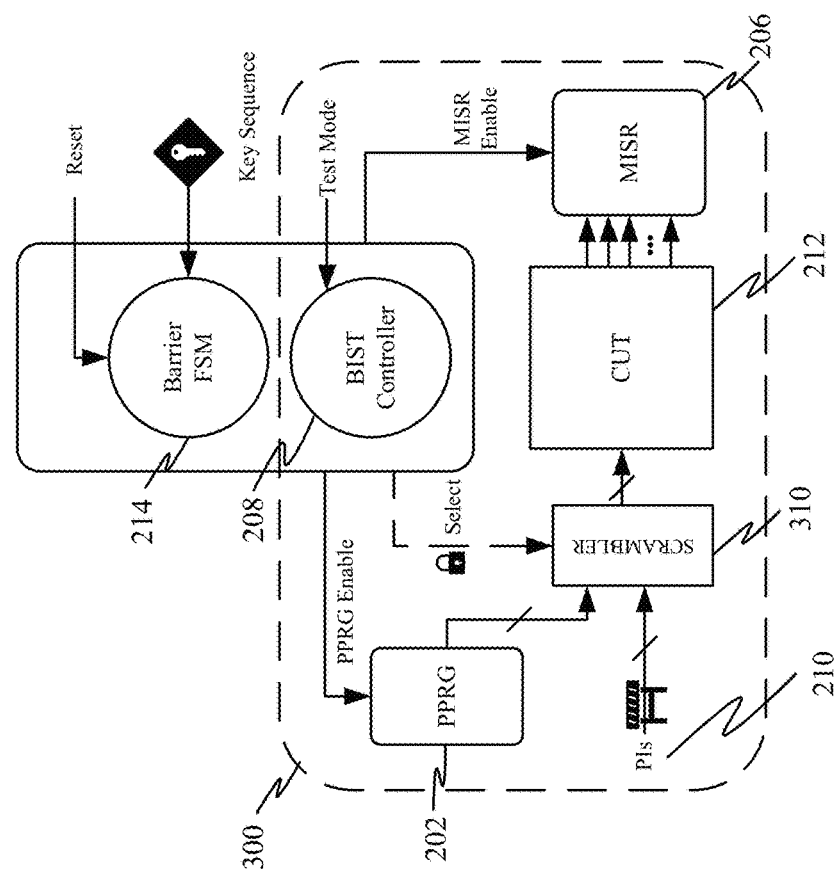
FIG. 3A illustrates a logic locking approach with a scrambler design.
Figure 3C:
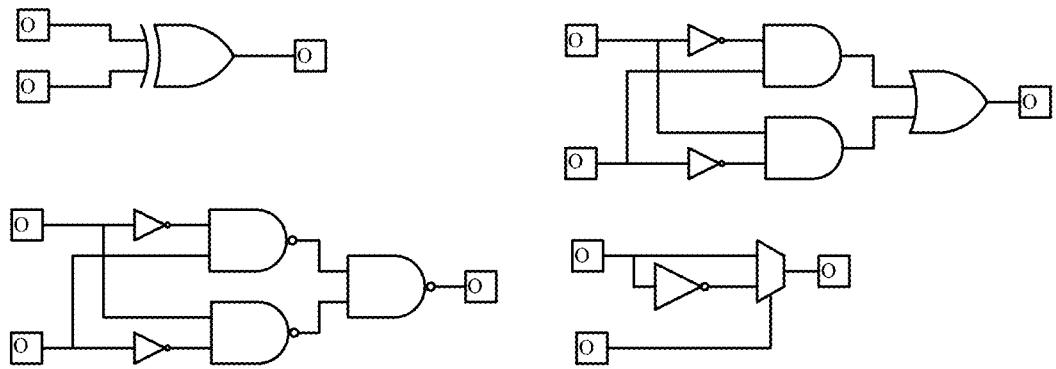
FIG. 3C illustrates example XOR implementations that may be used for a scrambler design.

FIG. 3A illustrates a logic locking approach with a scrambler design; FIG. 3B illustrates an example signal scrambler design and corresponding operation; and FIG. 3C illustrates example XOR implementations that may be used for a scrambler design.

Referring to FIG. 3A, a chip design 300 can include the elements of a PRPG 202, MISR 206, and BIST Controller 208 with barrier FSM 214 described with respect to the basic BIST architecture 200 with barrier FSM 214 of FIG. 2A. However, instead of a MUX, chip design 300 includes a signal scrambler 310.

The signal scrambler 310 can be used to support resiliency against removal attacks. The signal scrambler 310 can be formed of a plurality of multi-input logic gates that are disposed before the primary inputs 210 to the circuit (e.g., in position to receive the primary input signals for corresponding nodes). The signal scrambler 310 can receive the Primary Inputs (PIs) 210, the test patterns ("INIT") generated by the PRPG 202, and an initialization sequence of bits ("CODE") output by the BIST controller 208 when the key sequence bits are correctly input to the barrier FSM 214. The signal scrambler 310 functions to allow the primary inputs 210 to be applied to the CUT 212 without scrambling when the INIT bits and the CODE bits are set properly. The particular types of logic gates for the signal scrambler 310 can vary depending on implementation. In the illustrated example shown in FIG. 3B, XOR and XNOR gates are used. Insertion of an XOR-based signal scrambler protects against bypass attacks and the use of multiple XOR implementations with variable logic depth such as shown in FIG. 3C makes removal computationally expensive.

Referring to the example implementation of FIG. 3B, the scrambler 310 is constructed using a camouflaged layer of XOR/XNOR gates 312 with three inputs 314. To protect each input of the primary inputs 210, either a three-input XOR or a three-input XNOR gate may be chosen arbitrarily. The other two inputs to the XOR/XNOR gates 312 are the CODE bits 320 derived from the output state of the barrier FSM as well as the INIT bits 322 from the PRPG 202. In some cases, the CODE bits 320 are the same bits as the key sequence input to the barrier FSM 214; however, for improved security, the CODE bits 320 can be generated to support maximized output corruption due to the scrambling. In some cases, the CODE bits 320 are generated by a scrambler initialization logic circuit, which can be implemented as described with respect to scrambler initialization logic 618 of FIG. 6, that takes the key sequence received as the initialization of the BIST controller 208 and translates the key sequence into a sequence of CODE bits 320. For example, the scrambler initialization logic circuit can be a tree of AND/NAND gates. Of course, other gates/combinational logic (and techniques) may be used to generate the CODE bits 320 using the key sequence.

In operation, the locked IC boots up in self-test mode. While in test mode, the PRPG 202 is initialized with a pre-evaluated seed and runs for K cycles (where k is the number of inputs) until the PRPG 202 is disabled by the initialization at the BIST controller 208 (because of the key sequence completion, for example, of 128 cycles), indicating the end of the self-test mode. The output of the PRPG 202 is fed into the first input of the three-input XOR/XNOR gates 312 in the scrambler. In this example, the seed is 1101 and the INIT bits are 0111 after the 128 cycles. Simultaneously, the output of the barrier FSM (e.g., the initialized signal, which may be the key sequence) is fed into a tree of AND/NAND gates (not shown) to generate the CODE bits, which provide the second input to the three-input XOR/XNOR gates 312 in the scrambler. As can be seen, the CODE is 0101. The PRPG INIT bit is equal to the CODE bit for an XOR gate, and the complement of the CODE bit for an XNOR gate. Here, because the scrambler is shown as XOR, XOR, XNOR, and XOR, the INIT bits are the same as the CODE bits for the first, second and fourth gates and are different for the third gate.

This initialization ensures that in functional mode, the scrambler propagates the correct PI bits to the IC circuit (CUT 212). Improper initialization of the barrier FSM due to an incorrect key will result in a different CODE value, which results in a bit flip for the primary inputs. Accordingly, an IC protection circuit for an IC (CUT 212) can include a controller (e.g., BIST controller 208) with a barrier FSM (e.g., barrier FSM 214) that has a key sequence input that unlocks the controller; and a signal scrambler 310 that receives at least two initialization inputs where at least one of the initialization inputs is based on the output of the barrier FSM (e.g., the CODE bits and the INIT bits) and a primary input path (e.g., the primary inputs).

Different implementations of XOR/XNOR gates with varying logic depths can be used to further camouflage the scrambler. Various designs for XOR gates, such as the examples shown in FIG. 3C, can be used, which are not revealed to the attacker. XOR designs with higher logic depths are less vulnerable to removal attacks, but at the same time result in higher area and performance overhead.

The insertion of the scrambler 310 has no impact on either manufacturing-test or self-test. Scan-based manufacturing test, typically done in an untrusted setting, can be accomplished without unlocking the CUT 212. Test patterns can be obtained by running ATPG algorithms on the scrambler-inserted design. For self-test, the inputs to the CUT 212, which are supplied by the PRPG in test-mode, are also scrambled. Thus, design-for-test engineers would first obtain the scrambled PRPG inputs via simulation to compute their corresponding golden signatures. Similar to manufacturing test, the output of the barrier-FSM state register are also held at a pre-defined value to maximize the test coverage during self-test. Once the CUT is unlocked, it is also possible to switch between scan, self-test, and functional modes by using the BIST controller with barrier FSM.

Advantageously, because the logic gates of the scrambler 310 are similar types of logic gates as would be found in a CUT 212, an attacker may not be able to discern which gates belong to the IC protection and which gates belong to the CUT 212. In addition, it is possible to synthesize the scrambler 310 with the circuit design of the CUT 212 such that inspection of the layout does not easily reveal the protection. Indeed, since the XOR/XNOR implementations constituting the scrambler 310 are of variable logic depth, such as shown in FIG. 3C, the boundary between the scrambler and the IC design is further obfuscated post-synthesis, making structural analysis-based removal attacks more difficult. The resulting iterations an attacker may need to make is exponentially proportional to the number of inputs k and proportional to the logic depth of each XOR combination.

To provide protection against SAT attacks due to an attacker successfully identifying the INIT input from the PRPG 202 and the CODE input from the controller 208, dynamic obfuscation can be included as part of the IC protection.

Figure 4:
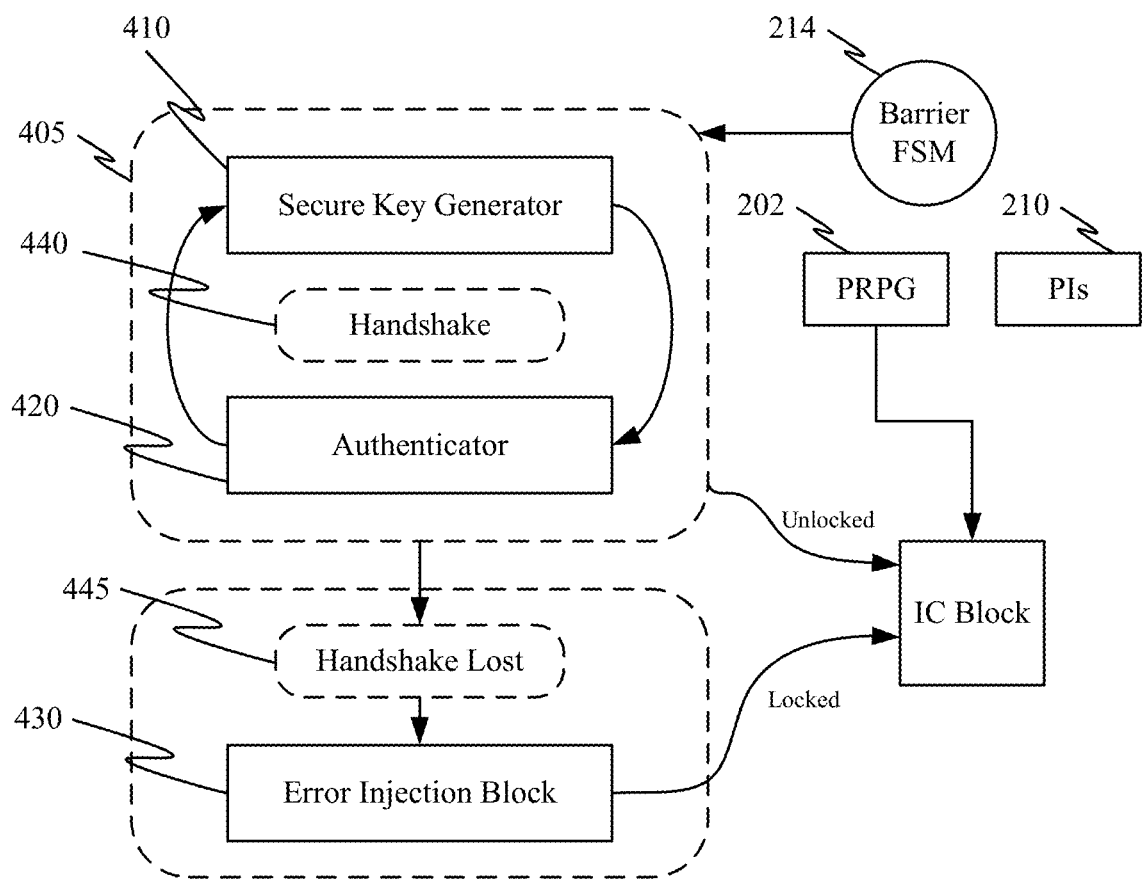
FIG. 4 illustrates a dynamic authentication approach for dynamic obfuscation IC protection.
Figure 5A:
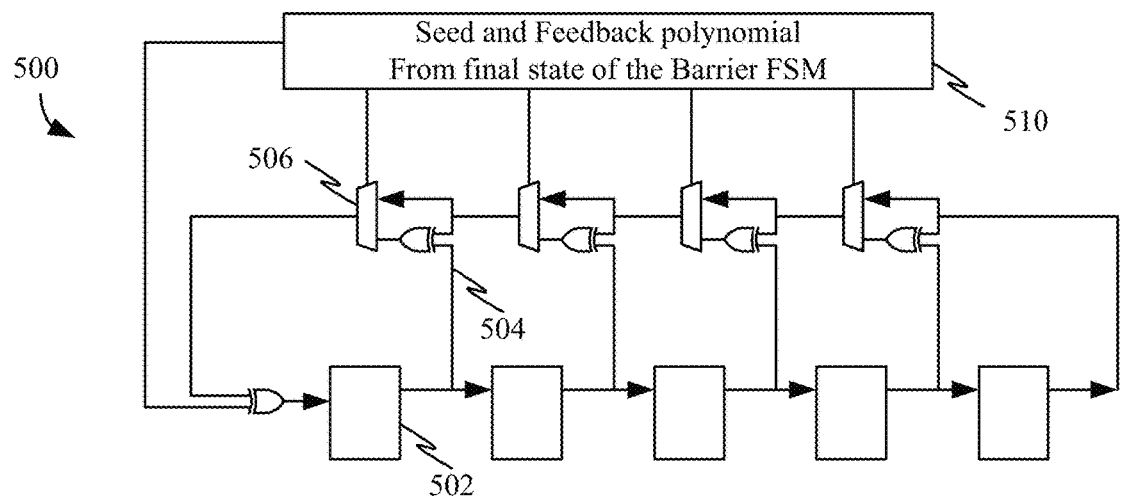
FIG. 5A shows a reconfigurable linear feedback shift register (LFSR) that can be used for key-sequence generation.

FIG. 4 illustrates a dynamic authentication approach for dynamic obfuscation IC protection. A dynamic authentication approach maintains per-clock synchronization while dynamically changing states. Referring to FIG. 4 a dynamic authentication circuit 400 includes a dynamic authentication block 405 having a dynamic sequence generator (DSG) block 410 and a dynamic sequence authenticator (DSA) block 420; and an error-injection block 430. The dynamic authentication block 405 is initialized from the barrier FSM 214. One or both of the DSG 410 and DSA 420 are initialized from the barrier FSM 214 based on the key sequence. An example configuration of the dynamic authentication block is shown in FIG. 5C. The DSG 410 and the DSA 420 communicate to maintain a secure per clock synchronization handshake signal 440 that protects the IC 212 whether in test mode (e.g., based on test signals generated at PRPG 202) or in functional operation (for primary inputs 210).

If the handshake signal 440 is lost (445) even for a single clock cycle, either during an attack or because an incorrect key is entered via the barrier FSM 214, the error-injection block 430 causes the IC 212 to enter a locked and dysfunctional state. The DSG 410 and DSA 420 can be implemented using LFSR-based reconfigurable blocks such as shown in FIG. 5A. According to various implementations, the DSG 410 and the DSA 420 are each formed of one or more reconfigurable LFSRs.

FIG. 5A shows a reconfigurable LFSR that can be used for key-sequence generation. Referring to FIG. 5A, a reconfigurable LFSR key-sequence generator 500 includes a series of flip-flops 502 (e.g., shift register) with feedback from taps 504 in the register chain, where the taps are multiplexed (e.g., via MUX 506) under control of a seed and feedback polynomial (510) from a final state of the barrier FSM 214. That is, each XOR gate 508 of the LFSR is multiplexed with MUX 506 with the feedback coming in from a subsequent flip-flop in the LFSR 500. Depending on how the MUXs 506 are initialized, it is possible to choose which of these XOR gates 508 are part of the feedback, which is used to drive the LFSR 500. Indeed, the output of the barrier FSM 212 would be used to both initialize the seed of the LFSR 500, as well as determine the feedback configuration of the LFSR 500. Accordingly, the LFSR 500 can be configured across multiple possible feedback cases and the feedback state is determined by the select line of the of the MUX 506.

In some cases, a standard feedback polynomial (fixed) could be used instead of the reconfigurable feedback polynomial; however, the reconfigurable feedback provides added security with ease of error injection. An attacker must identify both the seed as well as the feedback polynomial 510 (providing MUX select lines) in order to successfully generate the correct key sequence. In some cases, an LFSR used for the dynamic authentication is a 16 bit LFSR. In some cases, an LFSR used for the dynamic authentication is a 32 bit LFSR. The size and number of LFSRs used for the described blocks of the dynamic authentication circuit can be selected based on extent of protection desired (e.g., even a single 16 or 32 bit LFSR can be difficult to brute force through with certain existing oracle-free attacks).

Figure 5B:
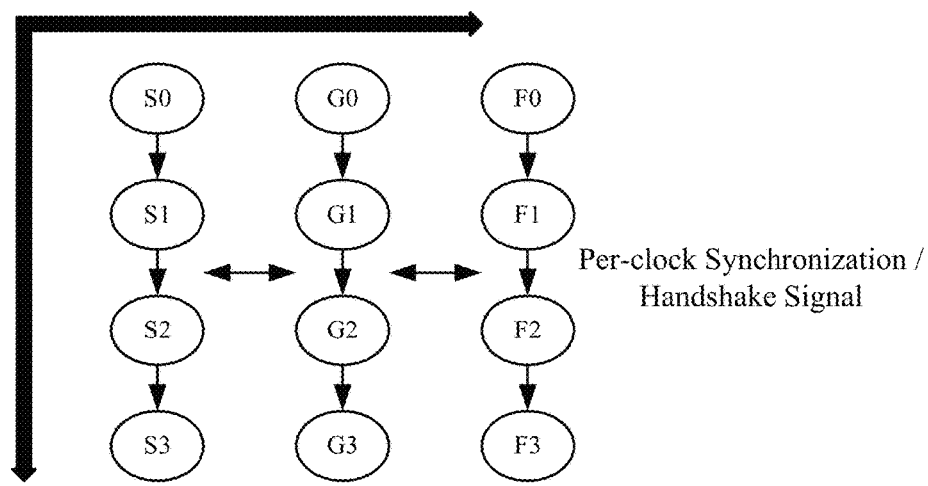
FIG. 5B illustrates dynamic key operation.
Figure 5C:
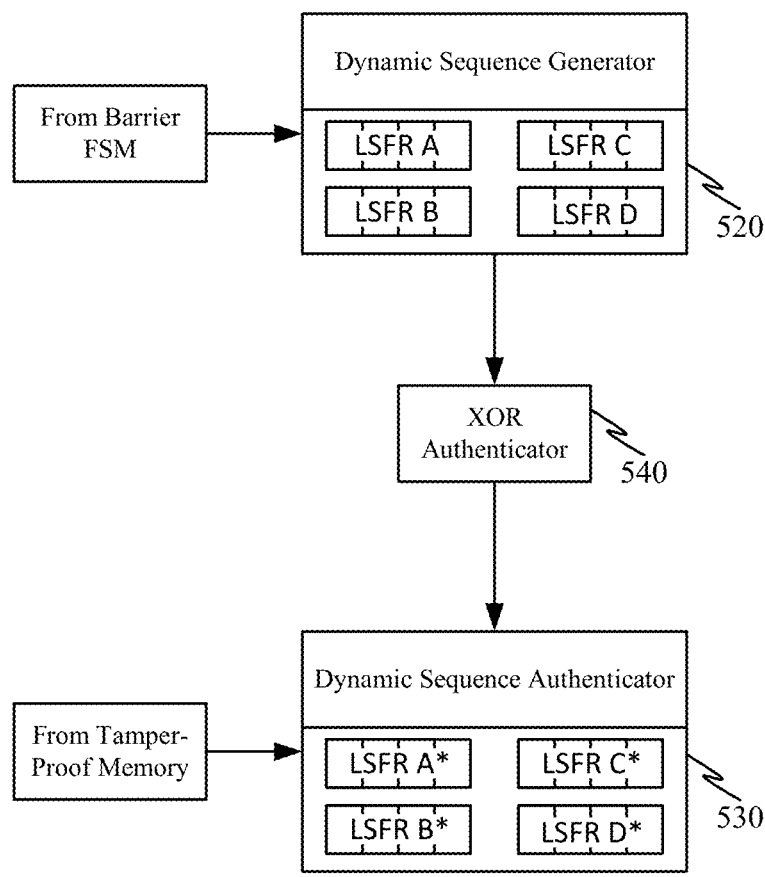
FIG. 5C shows an example configuration of a dynamic authentication block.

FIG. 5B illustrates dynamic key operation. Referring to FIG. 5B, dynamic keys generated from the output of the reconfigurable LFSRs can enforce per clock synchronization such that states remain in lockstep. Accordingly, it is possible to maintain per-clock synchronization of a handshake signal. In FIG. 5B, state transition graphs of three LFSRs running in parallel are shown. One LFSR block is running using the states S0, S1, S2, and S3. Another LFSR block is running concurrently to generate states G0, G1, G2, and G3; and yet another LFSR block is running concurrently to generate states F0, F1, F2, and F3. It should be understood that the blocks can be scaled across larger LFSRs (Y-axis) and additional number of LFSRs (x-axis). The states shift at each clock cycle so when S0 is paired with G0 and F0, only then will the system be in the unlock state. Similarly, if S0 is paired with, for example, G1 and F2, that would lock the system. In this way, there is only one sequence of the order of all of these three different free running state transition diagrams that will unlock the IC 212.

FIG. 5C shows an example configuration of a dynamic authentication block. Referring to FIG. 5C, a dynamic sequence generator 520 can include four LFSRs (LFSR A, LFSR B, LFSR C, LFSR D) and a dynamic sequence authenticator 530 can include a corresponding four LFSRs (LFSR A*, LFSR B*, LFSR C*, LFSR D*). The dynamic sequence generator 520 is initialized (e.g., seeded and configured with feedback polynomial) by the barrier FSM and the dynamic sequence authenticator 530 is initialized (e.g., seeded and configured with feedback polynomial) by a tamper-proof memory. Once the system comes out of a reset state, the LFSRs of the DSG 520 and DSA 530 will go through the states in the preset state transition sequences set up by the seed and feedback polynomial. The output of the DSG 520 and DSA 530 are compared and if the blocks are operating in sync with the same states, then the system can be unlocked. In the illustrated example, an XOR authenticator 540 is used to compare the outputs between the DSG 520 and DSA 530. For authentication to be achieved, these outputs must match. When the comparator (e.g., XOR authenticator 540) indicates a mismatch, error is injected into the system, for example, due to the change in a bit from the output of the comparator.

The system is in synchronization when the corresponding one or more LFSRs in both the DSG 520 and DSA 530 are initialized with identical seeds. Advantageously, there is no need for a separate XOR tree-based error injection block since in the case of scan-access/incorrect key, the feedback polynomial changes leading to incorrect authentication (and thus, no separate error injection block is required).

Figure 6:
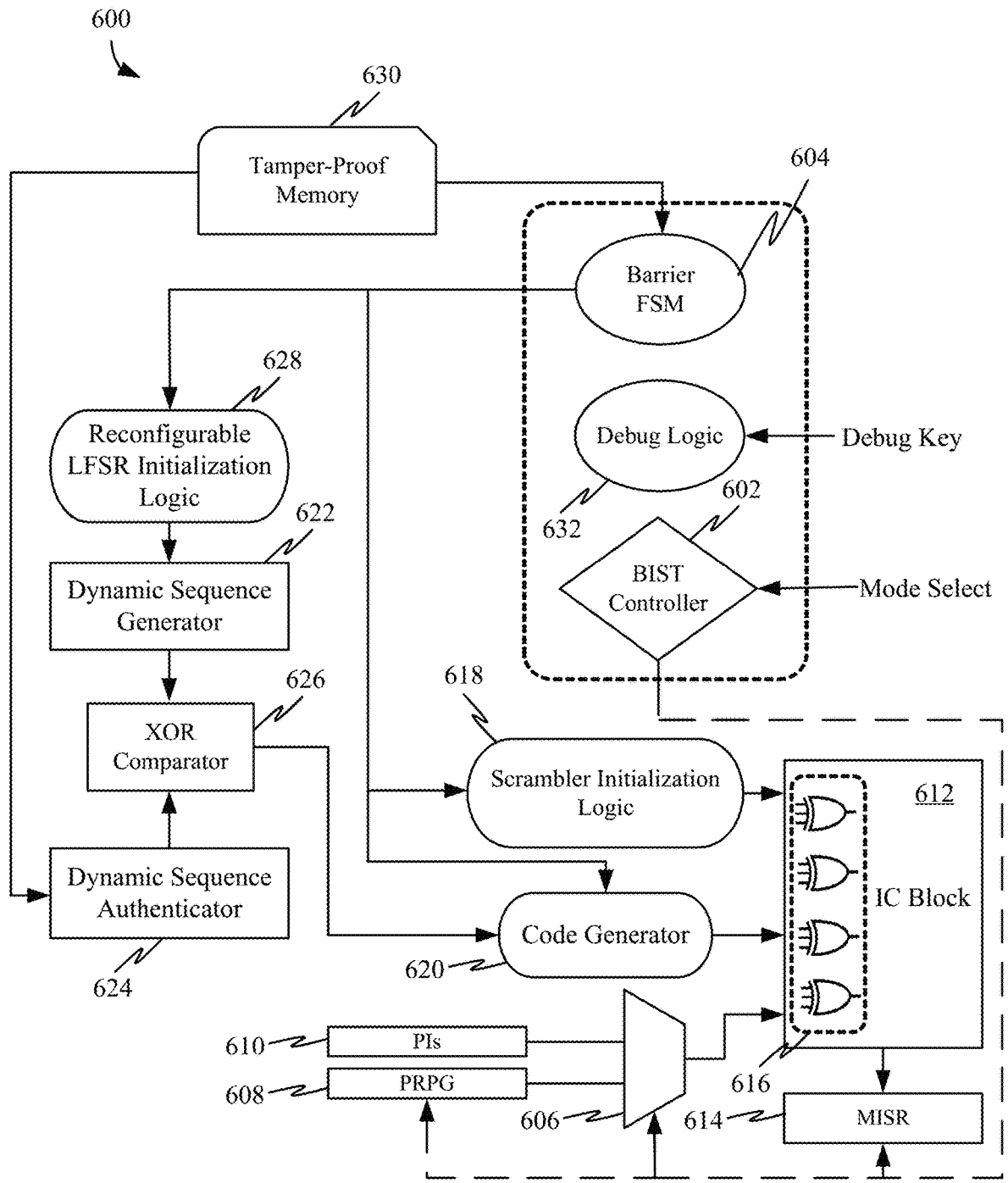
FIG. 6 illustrates a logic locking approach with a scrambler design and dynamic authentication.

FIG. 6 illustrates a logic locking approach with a scrambler design and dynamic authentication. Referring to FIG. 6, a chip design 600 can include a BIST Controller 602 with Barrier FSM 604. The BIST controller 602 and barrier FSM 604 can operate as described with respect to the BIST controller 208 with barrier FSM 214 of FIG. 2A, where the barrier FSM 214 is used to unlock the controller in order to switch from test-mode to functional mode (e.g., by selection of MUX 606 that selects between test patterns generated by a PRPG 608 and the primary inputs 610 for application to the IC 612). The other component of the BIST architecture shown but not yet described is the MISR 614.

Chip design 600 further includes a signal scrambler 616, which can be implemented as described with respect to signal scrambler 310 of FIG. 3A, for example using XOR and XNOR gates as described with respect to FIGS. 3B and 3C. Here, the three inputs for the multi-input logic gates of the signal scrambler 616 include the output of MUX 606, INIT bits from a scrambler initialization logic 618, and CODE bits from a code generator 620.

The scrambler initialization logic 618 can be custom logic, such as look-up tables or combinational logic (including AND/NAND trees), that maps the barrier FSM state register value (from the barrier FSM 604) to an appropriate scrambler initialization value (for the INIT bits to the input signal scrambler 616). Combinational logic refers to a circuit whose outputs depend on the current state of its inputs and is generally implemented by Boolean circuits (which can be described using logic expressions or truth tables and are commonly in the form of AND/NAND, OR/NOR, and NOT gates that are combined or connected to produce more complicated logic).

Chip design 600 further includes a dynamic authentication circuit, which in the illustrated example, is implemented with the components described with respect to FIG. 5C. In particular, the dynamic authentication circuit can include a dynamic sequence generator 622, a dynamic sequence authenticator 624, and a XOR comparator 626. The dynamic sequence generator 622 can receive a seed and feedback polynomial from the barrier FSM 604. In some cases, a reconfigurable LFSR initialization logic 628 can be included to appropriately initialize the one or more reconfigurable LFSRs that make up the dynamic sequence generator 622 from the barrier FSM state register values. The dynamic sequence authenticator 624 can receive the seed and feedback polynomial from tamper-proof memory 630. The XOR comparator 626 compares the outputs of the dynamic sequence generator 622 and the dynamic sequence authenticator 624 and outputs the result to the code generator 620.

The code generator 620 can be combinational logic that translates the output of the XOR comparator 626 and the barrier FSM state register values (from the barrier FSM 604) to an appropriate initialization bit (the CODE bit) for the signal scrambler 616.

A debug logic 632 may also be included as part of the controller to receive a debug key, which provides a bypass of the dynamic obfuscation when a scan_enable signal is asserted. Without a bypass, the assertion of a "scan_enable" signal would change the feedback path of the LFSRs in the dynamic sequence generator. The bypass allows for the functionally correct (un-obfuscated) operation if the correct debug key is supplied.

In operation, for a destructive reset/power-on reset, keys can be loaded from the tamper-proof memory 630 to the barrier FSM 604 to begin an unlocking sequence of the barrier FSM 604. Once the barrier FSM 604 is unlocked, combinationally generated seeds and feedback polynomials can be reconfigured and an authentication sequence starts (using the dynamic authentication circuit) along with operation of the signal scrambler 616. If an incorrect key is asserted, the barrier FSM state changes, leading to reconfiguration of the one or more LFSRs (of the dynamic sequence generator 622). When scan-enable is asserted, the barrier FSM state changes leading to reconfiguration of the one or more LFSRs (of the dynamic sequence generator 622) except if the debug key is also supplied to the debug logic 632, which prevents the reconfiguration, thereby preventing dynamic obfuscation.

Accordingly, an IC protection circuit for an IC 612 can include a controller (e.g., BIST controller 602) with a barrier FSM (e.g., barrier FSM 604) that has a key sequence input that unlocks the controller; and a signal scrambler 616 coupled to receive at least two initialization inputs where at least one of the initialization inputs is based on the output of the barrier FSM (in this case both initialization inputs can be based in part on the output of the barrier FSM) and a primary input path (e.g., the output of MUX 606).

Figure 7:
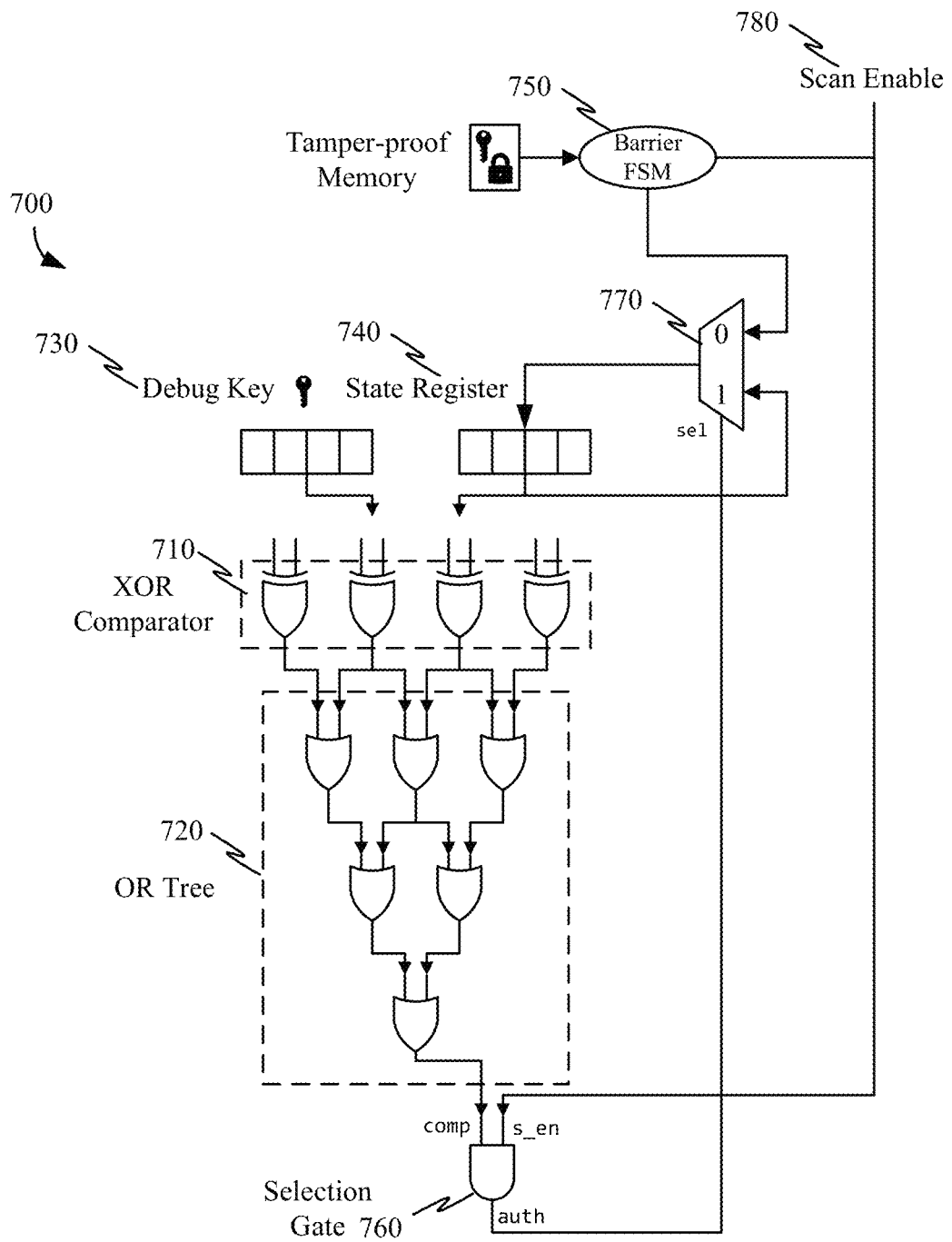
FIG. 7 illustrates an example configuration for providing scan access for debug purposes.

FIG. 7 illustrates an example configuration for providing scan access for debug purposes. Referring to FIG. 7, debug logic 700 can include a comparator 710 and combinational logic 720 (that generates a comparison signal) such that when debug key 730 is equal to the state register value 740 of the barrier FSM 750 (upon correct initialization with correct key as described above), the authentication signal output by a selection gate 760 will always keep the Barrier FSM state register value to its original state (by selecting the input for MUX 770) so that the state register value 740 will not change when scan_enable 780 (s_en) is asserted. In the example implementation, the combinational logic 720 is an OR tree and the comparator 710 is an XOR comparator.

Figure 8:
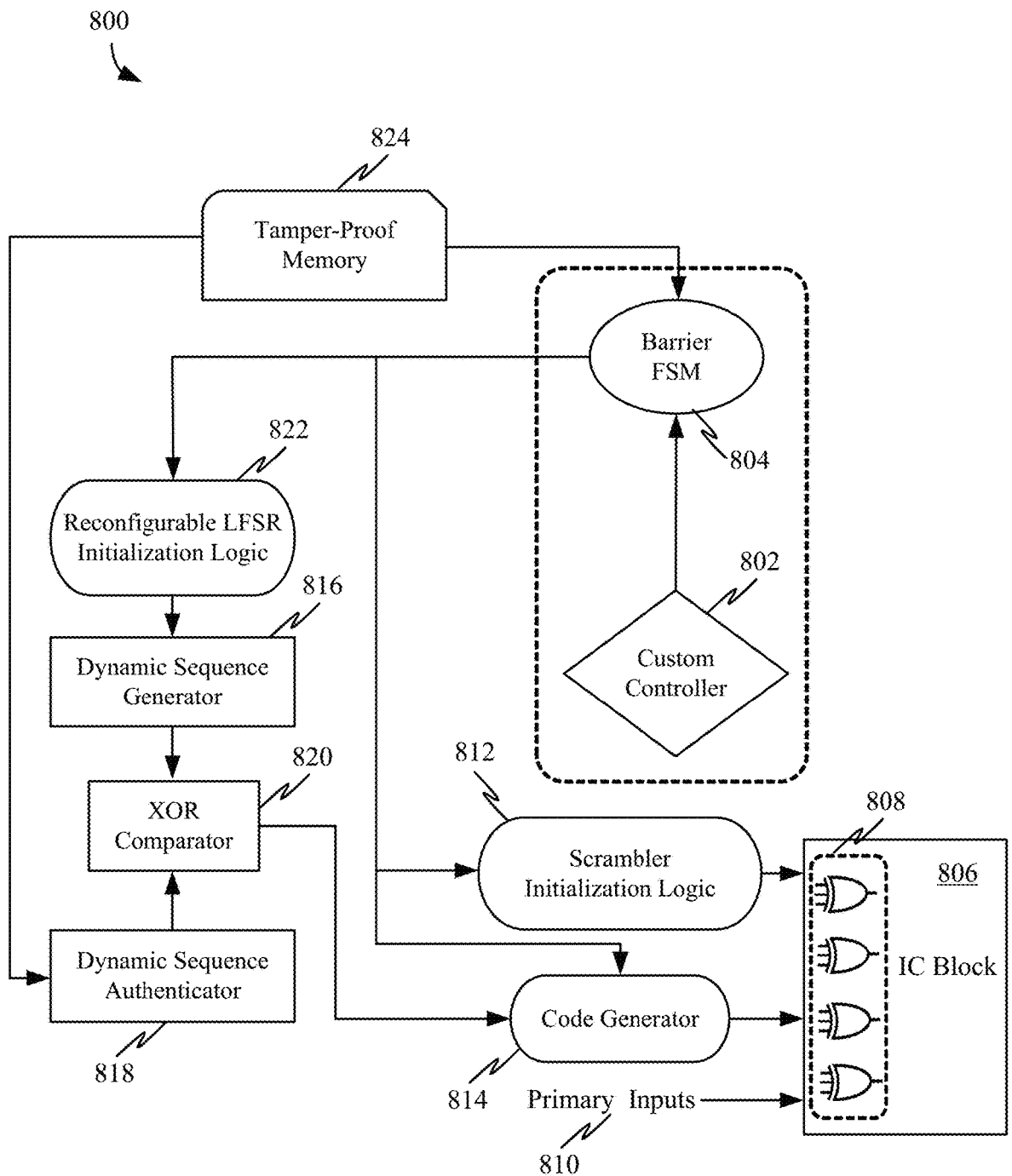
FIG. 8 illustrates an architecture for IC protection that does not incorporate a BIST design.

FIG. 8 illustrates an architecture for IC protection that does not incorporate a BIST design. Referring to FIG. 8, a chip design 800 can include a custom controller 802 that has a barrier FSM 804. The barrier FSM 804 is used to unlock the controller 802 to allow for functional operation of an IC 806.

Chip design 800 further includes a signal scrambler 808, which can be implemented as described with respect to signal scrambler 310 of FIG. 3A, for example using XOR and XNOR gates as described with respect to FIGS. 3B and 3C. Here, the three inputs for the multi-input logic gates of the signal scrambler 808 include the primary inputs 810, INIT bits from a scrambler initialization logic 812, and CODE bits from a code generator 814.

The scrambler initialization logic 812 can be custom logic, such as look-up tables or combinational logic (including AND/NAND trees), that maps the barrier FSM state register value (from the barrier FSM 804) to an appropriate scrambler initialization value (for the INIT bits to the input signal scrambler 808).

Chip design 800 further includes a dynamic authentication circuit, which in the illustrated example, is implemented with the components described with respect to FIG. 5C. In particular, the dynamic authentication circuit can include a dynamic sequence generator 816, a dynamic sequence authenticator 818, and a XOR comparator 820. The dynamic sequence generator 816 can receive a seed and feedback polynomial from the barrier FSM 804. In some cases, a reconfigurable LFSR initialization logic 822 can be included to appropriately initialize the one or more reconfigurable LFSRs that make up the dynamic sequence generator 816 from the barrier FSM state register values. The dynamic sequence authenticator 818 can receive the seed and feedback polynomial from tamper-proof memory 824. The XOR comparator 820 compares the outputs of the dynamic sequence generator 816 and the dynamic sequence authenticator 818 and outputs the result to the code generator 814.

The code generator 814 can be combinational logic that translates the output of the XOR comparator 820 and the barrier FSM state register values (from the barrier FSM 804) to an appropriate initialization bit (the CODE bit) for the signal scrambler 808.

Accordingly, an IC protection circuit for an IC 806 can include a controller (e.g., custom controller 802) with a barrier FSM (e.g., barrier FSM 804) that has a key sequence input that unlocks the controller; and a signal scrambler 808 coupled to receive at least two initialization inputs where at least one of the initialization inputs is based on the output of the barrier FSM (in this case both initialization inputs can be based in part on the output of the barrier FSM) and a primary input path (e.g., the primary inputs 810).

The described IC protection circuits can be inserted into a design and synthesized using a suitable electronic design automation tool (and stored as instructions and data structures on non-transitory computer readable media for execution by a computing device). Selections of which circuitry, including the options for the number of LFSRs for the can be selected during the design stage. The resulting layout files can be provided to a foundry for fabrication.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. An integrated circuit (IC) protection circuit for an IC, comprising:
   a controller comprising a barrier finite state machine (FSM) having a key sequence input that unlocks the controller; and
   a signal scrambler coupled to receive at least two initialization inputs and a primary input path and output a signal to the IC, wherein at least one initialization input of the at least two initialization inputs is based on an output of the barrier FSM.

2. The IC protection circuit of claim 1, wherein the controller is a built-in-self-test (BIST) controller.

3. The IC protection circuit of claim 1, wherein the signal scrambler comprises an XOR gate or XNOR gate for each input of the primary inputs.

4. The IC protection circuit of claim 1, wherein each XOR gate and XNOR gate of the signal scrambler is implemented from one of a plurality of different gate implementations having variable logic depth.

5. The IC protection circuit of claim 1, wherein a first initialization input of the at least two initialization inputs is based on the output of the barrier FSM; and a second initialization input of the at least two initialization inputs is a test pattern generated by a test pattern generator of a built-in-self-test (BIST) architecture.

6. The IC protection circuit of claim 1, further comprising scrambler initialization logic that receives the output of the barrier FSM to generate an initialization input of the at least two initialization inputs of the signal scrambler.

7. The IC protection circuit of claim 6, wherein the scrambler initialization logic comprises a look up table or combinational logic.

8. The IC protection circuit of claim 1, further comprising:
   a dynamic authentication circuit coupled to receive the output of the barrier FSM and output a signal to the signal scrambler for one of the at least two initialization inputs.

9. The IC protection circuit of claim 8, wherein the dynamic authentication circuit comprises:
   a dynamic sequence generator comprising one or more linear feedback shift registers (LFSRs);
   a dynamic sequence authenticator comprising one or more corresponding LFSRs; and
   a comparator coupled to compare states of the dynamic sequence generator with states of the dynamic sequence authenticator and output an authentication signal to the signal scrambler.

10. The IC protection circuit of claim 9, wherein each of the one or more LFSRs and the one or more corresponding LFSRs is a reconfigurable LFSR comprising multiplexed tap nodes selectable by a feedback polynomial.

11. The IC protection circuit of claim 10, wherein the dynamic sequence generator receives a particular feedback polynomial from the output of the barrier FSM.

12. The IC protection circuit of claim 11, further comprising LFSR initialization logic coupled to receive the output of the barrier FSM and provide the particular feedback polynomial to the dynamic sequence generator.

13. The IC protection circuit of claim 10, wherein the dynamic sequence authenticator receives a particular feedback polynomial from a tamper-proof memory.

14. The IC protection circuit of claim 9, wherein the comparator comprises an XOR comparator.

15. The IC protection circuit of claim 14, wherein an output of the XOR comparator is coupled to a code generator circuit that receives the authentication signal and the output of the barrier FSM to generate the one of the at least two initialization inputs of the signal scrambler.

16. The IC protection circuit of claim 15, wherein the code generator circuit comprises combinational logic.

17. The IC protection circuit of claim 8, further comprising a debug logic to bypass the dynamic authentication circuit during a test mode of the IC.

18. The IC protection circuit of claim 17, wherein the debug logic comprises:
   a comparator coupled to receive the output of the barrier FSM and a debug key;
   combinational logic coupled to receive an output of the comparator and generate a comparison signal; and
   a selection gate coupled to receive the comparison signal and a scan enable signal of the test mode to output an authorization signal that prevents a register value of the barrier FSM from changing state while the scan enable signal is asserted.

* * * * *